United States Patent [19]

Sedam

[11] E Patent Number: Re. 33,338

[45] Reissued Date of Patent: Sep. 18, 1990

[54] MEMBRANE SEAL AND KNIFE COMBINATION FOR A POST-MIX BEVERAGE DISPENSING SYSTEM

[75] Inventor: Jason K. Sedam, Dunwoody, Ga.

[73] Assignee: The Coca-Cola Company, Atlanta, Ga.

[21] Appl. No.: 819,425

[22] Filed: Jan. 16, 1986

Related U.S. Patent Documents

Reissue of:

[64] Patent No.: 4,426,019
Issued: Jan. 17, 1984
Appl. No.: 311,645
Filed: Oct. 15, 1981

[51] Int. Cl.[5] ..... B67B 7/24

[52] U.S. Cl. ..... 222/88; 222/481

[58] Field of Search ..... 222/83, 83.5, 88, 481, 222/146.6, 85, 86, 87; 30/443–450; 141/330, 329

[56] References Cited

U.S. PATENT DOCUMENTS

| | | | |
|---|---|---|---|
| 1,241,352 | 9/1917 | Doering | 222/88 |
| 2,031,616 | 2/1936 | Nall | 222/460 X |
| 2,058,905 | 10/1936 | Moran et al. | 222/86 |
| 2,698,113 | 12/1954 | Linton | 222/83 |
| 2,751,678 | 6/1956 | Bauer | 30/450 |
| 3,200,994 | 8/1965 | Levinson et al. | 222/82 |
| 3,404,811 | 10/1968 | Cernei | 222/83 |
| 3,685,694 | 8/1972 | Ianelli | 222/82 |
| 3,957,176 | 5/1976 | Marston | 222/185 |
| 3,995,773 | 12/1976 | Schmidt | 222/91 |
| 4,050,611 | 9/1977 | Frantz | 222/88 |
| 4,076,147 | 2/1978 | Schmidt | 222/89 |
| 4,149,573 | 4/1979 | Cassia | 141/18 |
| 4,216,885 | 8/1980 | Sedam | 222/481 |
| 4,267,945 | 5/1981 | Maynard, Jr. | 222/83.5 |
| 4,306,667 | 12/1981 | Sedam et al. | 222/83.5 |
| 4,314,768 | 2/1982 | Goglio et al. | 366/156 |

FOREIGN PATENT DOCUMENTS

| | | | |
|---|---|---|---|
| 519675 | 6/1979 | Australia . | |
| 526182 | 11/1979 | Australia . | |
| 534496 | 8/1959 | Belgium . | |
| 1595 | 5/1979 | European Pat. Off. . | |
| 754739 | 12/1934 | France . | |
| 44671 | 3/1935 | France | 222/88 |
| 610854 | 5/1979 | Switzerland . | |

*Primary Examiner*—Joseph J. Rolla
*Attorney, Agent, or Firm*—Birch, Stewart, Kolasch & Birch

[57] ABSTRACT

A post-mix beverage dispensing system is disclosed which comprises a syrup dispenser provided with a rupturable membrane which seals the discharge end thereof and a vent with a vent cap on the opposite end thereof. An opening device is provided comprising a cylindrical piercing knife and a socket for receiving the membrane seal end of the syrup container. Due to the unique structure of the opening device, the rupturable membrane is effectively pierced and displaced upon insertion thereof into the socket, thus providing unobstructed continuous flow of the syrup from the container into an associated valve body.

26 Claims, 3 Drawing Sheets

MEMBRANE SEAL AND KNIFE COMBINATION FOR A POST-MIX BEVERAGE DISPENSING SYSTEM

Matter enclosed in heavy brackets [ ] appears in the original patent but forms no part of this reissue specification; matter printed in italics indicates the additions made by reissue.

BACKGROUND OF THE INVENTION

The present invention relates to a post-mix soft drink dispenser suitable for use in a refrigerated cabinet and more specifically to a syrup dispensing system therefor.

Heretofore, attempts have been made to provide syrup packages for post-mix dispenser systems which are compact and easily inserted into post-mix beverage dispensing systems. It is desirable that the syrup be dispensed from the package at a controlled rate of flow or at least with continuous flow and mixed with carbonated water to produce a carbonated beverage with a controllable quality. The use of a flow rate control tube in the syrup container of a post-mix dispenser for providing an even flow rate of syrup from the container into a receptable is generally known. An example of such a system is disclosed in U.S. Pat. No. 2,708,533 to Nicholas. As illustrated in the reference patent, the bottom of the container is rupturable by a puncturing element associated with the dispenser valve and the top of the container is provided with a knock-out portion into which a stopper and flow control tube are inserted just prior to the dispensing operation.

An improved syrup package with an integral flow rate control tube is described in U.S. Pat. No. 4,216,885 to Jason K. Sedam, which is assigned to the same assignee as the present invention. In this Sedam Patent, a piercing device within a socket is adapted to pierce a flexible membrane disposed across the discharge opening of an inverted syrup package.

With the use of prior puncturing devices associated with the syrup packages such as disclosed by Nicholas and Sedam, it is essential that the opening created in the package for the flow of the particular ingredient, such as syrup, be properly engineered so as to provide for a continuous and unobstructed flow of the syrup to the associated valve dispenser. If not properly configured and sized, these puncturing devices can cause blockage of syrup flow and the creation of irregular openings which effect the flow rate and continuity of distribution of the syrup and ensuing dispensing of the beverage.

Of course, even if the syrup package or container used in combination with a puncturing device does not have a flow rate control tube therein, it is still important that syrup flow from the container be continuous and unobstructed. For example, a syrup package merely having a vent hole in a wall opposite to the discharge opening and no flow tube will have continuous, but variable, flow under normal operating conditions. In order to maintain this continuous but variable flow, it is important that any puncturing device be properly configured and sized.

SUMMARY OF THE INVENTION

Therefore, it is an object of the present invention to provide a syrup package and opening system for a post-mix soft drink dispenser which will overcome the above noted disadvantages.

It is a further object of the present invention to provide an opening system for a dispenser unit which eliminates restrictions at the discharge port.

Another object of the present invention is to provide a vented syrup package and opening system therefore which will provide for continuous and uninterrupted flow of the syrup.

Yet, another object of the present invention is to provide a beverage dispenser which is sanitary and cannot easily be refilled.

Still a further object of the present invention is to provide a syrup container and opening system wherein the container is an inexpensive disposable unit.

A further object of the present invention is to provide a knife and seal arrangement which effectively and reliably first seals off the discharge port and then pierces the closing membrane of a syrup package so as to preclude spilling and provide for unrestricted flow of the syrup through the discharge port.

Yet still a further object of the present invention is to provide a combination of syrup package and opening system which is unique to the soft drink industry.

The foregoing objects and others are accomplished in accordance with the present invention, generally speaking, by providing an opening device which comprises a cylindrically-shaped socket provided with a sealing ring adapted to receive the neck of a syrup package or container, the discharge opening of the container being closed by a rupturable membrane *or displaceable member*, and a cylindrical knife which is positioned within the socket so as to form an annular chamber or compartment between the outer wall of the knife and inner wall of the socket such that the knife pierces *or displaces* the membrane upon the insertion of the neck of the container into the socket compartment. The cut portion of the membrane of the package or container is folded back and held open against the inner surface of the container neck by the cylindrical piercing device while the neck of the container is seated within the socket. Prior to piercing of the membrane and complete seating within the socket, the neck of the container is sealed in between the sealing ring and the outer walls of the cylindrical knife. Then the cylindrical knife pierces the membrane of the container and is so configured that it provides approximately a 240° flap which, as stated above, is folded back against the inner surface of the neck of the container and held between the knife and the interior of the neck of the container as insertion of the container into the socket is completed. As a result, flow of the fluid through the center of the cylindrical knife upon demand by the regulation of the interconnecting valve system, to which the socket and knife are attached, is continuous and uninterrupted. The container may be provided with a vent which is opened or closed by a screw top which assists in the continuous flow of contents from the container. The cylindrical knife also includes a discharge port for discharging the fluid or syrup into the valve body and a drainage slot which ensures complete drainage from the container.

The vent referred to above may merely be a hole in the end wall of the container, or it may be in the end of a flow rate control tube such as disclosed in the aforementioned U.S. Pat. No. 4,216,885 to Jason K. Sedam. That is, the cylindrical knife and sealing means of the present invention may be used in combination with a vented container with or without a flow rate control tube. Furthermore, the knife and sealing means of the present invention could be used with unvented containers, if desired.

It has been determined in the course of the present invention that by designing a cylindrical piercing device or knife in the manner herein described, it is possible to provide an opening system for a liquid container, specifically a disposable bottle, presealed by a rupturable membrane such that the membrane is effectively displaced from an opening created by the piercing device to allow for continuous and unrestricted flow of liquid from the bottle. The cylindrical knife is designed to provide for minimum clearance within the neck of the container such that the membrane will shear cleanly and reliably. The blade portion of the cylindrical knife pierces the membrane so as to cut about a 240° segment therein which is folded against the inner surface or the interior of the neck of the container. After complete discharge of the liquid or syrup from the container or bottle, the latter is easily removed so as to make room for the insertion of a second bottle if and when desired.

BRIEF DESCRIPTION OF THE DRAWINGS

The invention is further described by way of the accompanying drawings wherein.

DETAILED DESCRIPTION OF THE INVENTION

Figure 1:
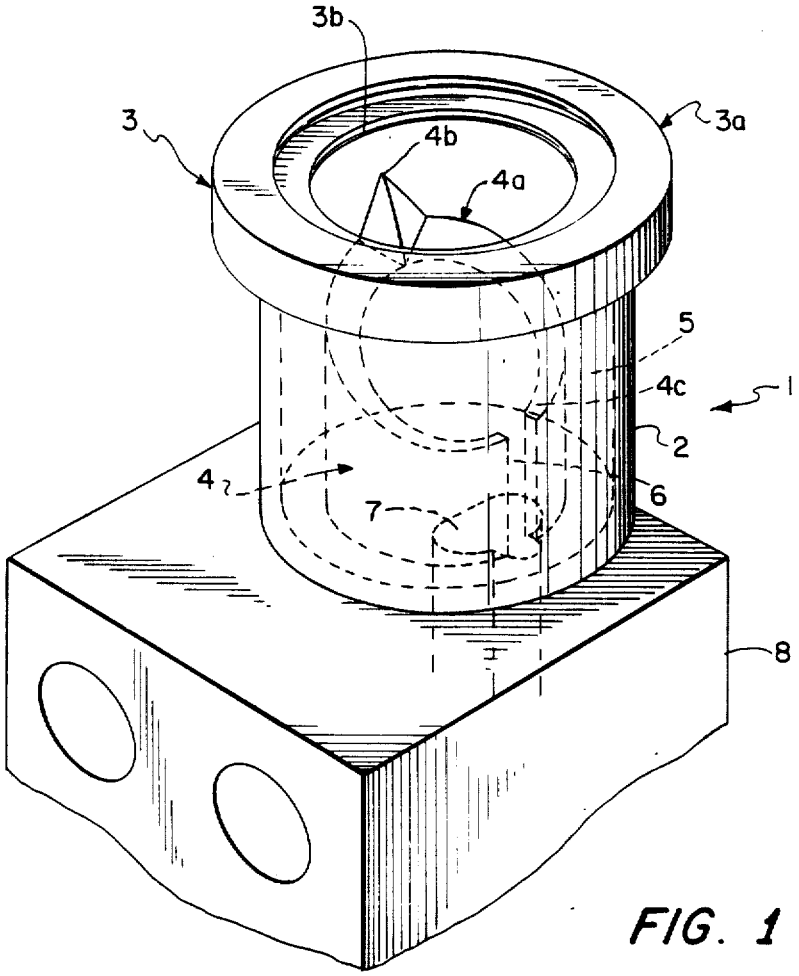
FIG. 1 represents a perspective view of the opening device of the present invention.

Referring now to FIG. 1, there is seen the opening system of the present invention generally designated 1, comprising a socket member 2 and a sealing ring 3 housing the cylindrical piercing device, *pushing means* or knife 4. An annular compartment 5 is formed between the outer wall of the piercing device 4 and the inner wall of the socket member 2. The sealing ring 3 comprises a seal retainer 3a and a resilient annular seal 3b. The sealing ring 3 allows for ready insertion of the neck of a container into the annular compartment 9, while providing a reliable seal about the neck of the container to prevent leakage of the contents therein. It also provides for easy removal of the container once it has been emptied.

The cylindrical cutting device or knife 4 has a truncated cutting edge *or actuator edge* with a blade portion 4a having a leading pyramidal piercing element 4b arranged on the apex of the cutting edge, and the blade edge terminating at its lower portion in a flat blunt surface 4c. A slot 6 is provided in the wall at the lowest portion of the truncated member which serves to ensure complete drainage of any liquid which might seep into annular chamber 5 of the contents of the container through discharge port 7 which leads to a valve body 8. The cutting surface or blade edge 4a of the cylindrical device is such that it cuts and displaces approximately a 240° flap coextensive with blade edge 4a in the rupturable membrane (*displaceable member*) of the syrup container further discussed below, the resulting flap being pushed or folded back by the flat surfaces 4c of the knife 4 against the interior of the neck of the container as insertion of the container into the socket compartment is completed. Thus, the remaining 120° of the circumference of the membrane forms a hinge about which the 240° flap can pivot. The size of the hinge portion (120°) is selected to preclude the possibility that the flap will tear and become completely severed from the lip of the container neck. Thus, the membrane cannot break loose and block the discharge passages of the dispenser system or pass into the post-mix beverage. Flow of syrup through the cylindrical knife upon demand is thus not impeded, and restriction or blockage of the discharge port is prevented.

Figure 2:
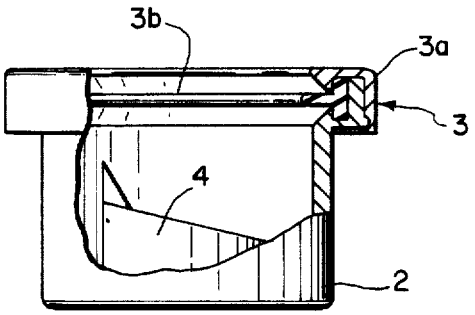
FIG. 2 represents a side cut-away view of the opening device of the present invention.

Referring now to FIG. 2, there is seen a side cut-away view of the opening device of the present invention illustrating the socket body 2, and the sealing ring 3 comprising the seal retainer 3a and annular resilient seal 3b, respectively. The cylindrical cutting device or knife 4 is positioned within the annular cavity circumscribed by the socket. The annular resilient seal 3b is so spaced from the top of cylindrical knife 4 that a seal is formed with the neck of the inserted container before knife 4 contacts the rupturable membrane. Thus, no spillage of the syrup can result, because sealing occurs prior to the cutting of the membrane. This will become more readily apparent hereinafter with respect to the description of operation illustrated in FIG. 4. Also, as illustrated from a comparison of FIGS. 2 and 4, the annular resilient seal 3b (FIG. 2) or 25 (FIG. 4) extends substantially orthogonally to the inner walls of socket 2 prior to insertion of a container (FIG. 2) to form a restricted opening for engaging the neck of a container to be inserted therein. As the container advances into the socket, the annular seal is flexed downwardly and thus firmly engages the container neck, as illustrated in FIG. 4.

Figure 3:
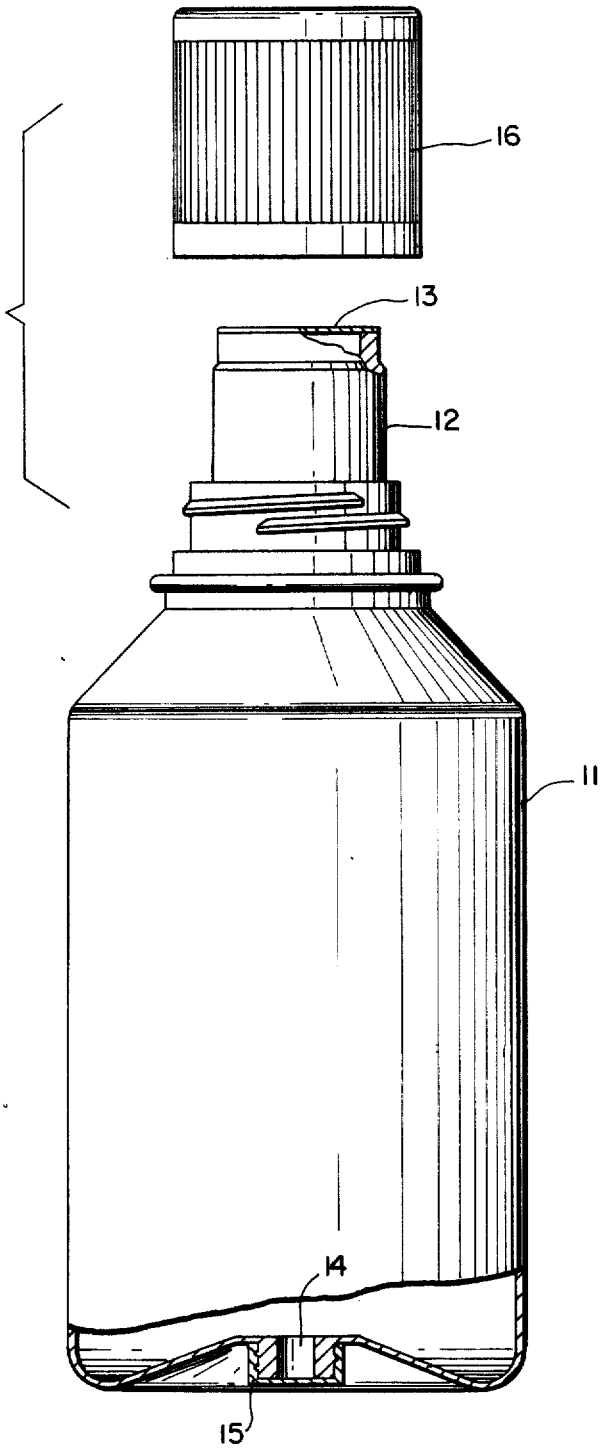
FIG. 3 represents the syrup container of the present invention.

FIG. 3 represents one possible syrup container for use with the present invention comprising the disposable package or bottle 11 terminating at one end in a neck 12 and a discharge opening sealed by membrane *or displaceable member* 13, with the end opposite the discharge opening having a vent 14 closed by vent cap 15. A protective screw-on closure 16 covers the neck and membrane 13 of the container when not in use. It should be understood that the syrup package disclosed in the aforementioned U.S. Pat. No. 4,216,885 to Jason K. Sedam can be used in place of the container 11 of FIG. 3, if desired.

Figure 4:
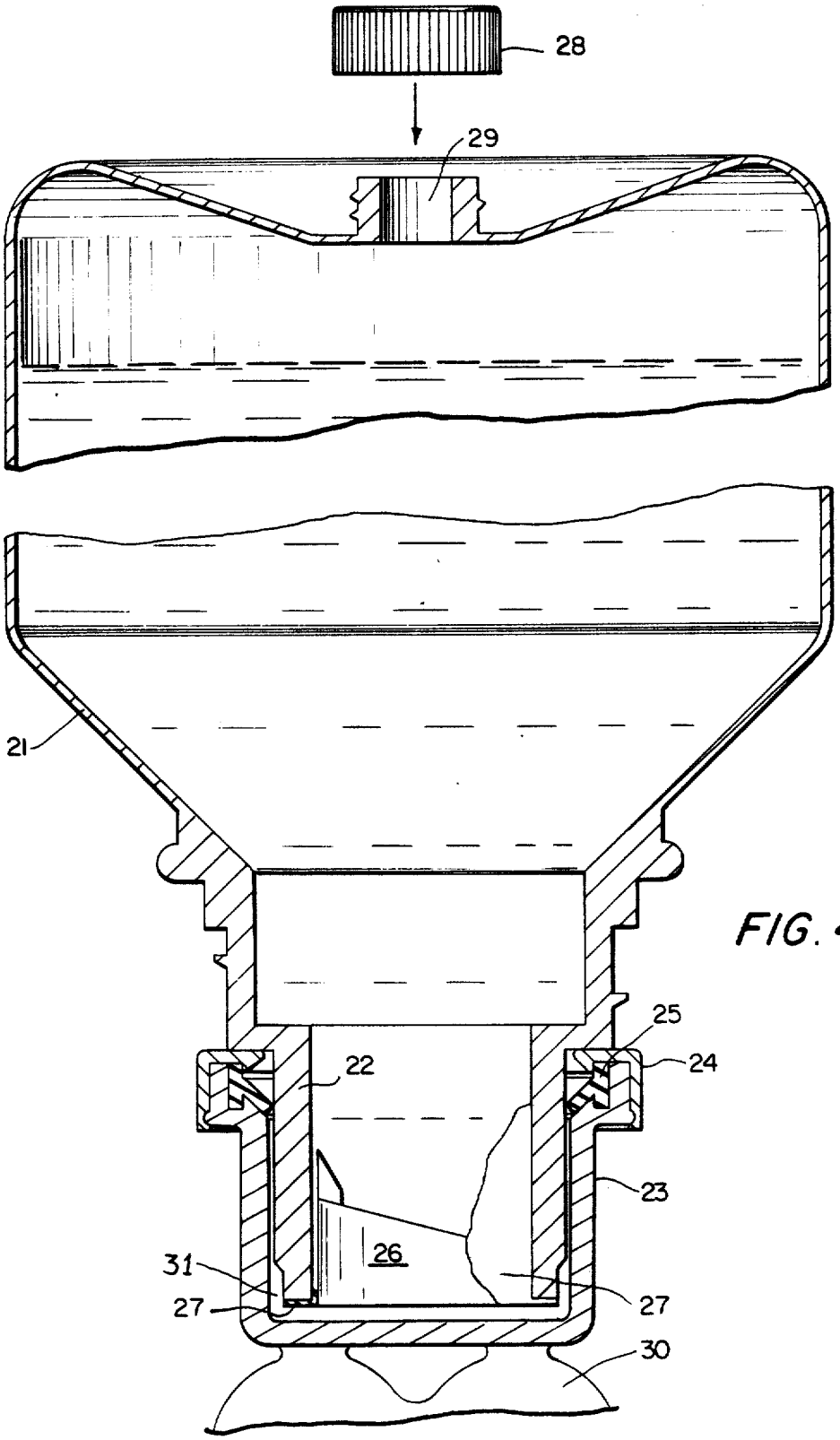
FIG. 4 illustrates the combination of the opening system of the present invention, together with the syrup container.

Referring now to FIG. 4, there is illustrated the combination of the syrup container of FIG. 3 placed in operation with the opening device of the present invention. A bottle or container 21 having a neck 22 is inserted into socket 23 such that the seal retainer 24 and annular resilient seal 25 securely surrounds and seals the neck of the bottle. As insertion of the bottle neck continues, the cylindrical cutting device 26 pierces, cuts and displaces the membrane [26] *27* as the container continues to be lowered or inserted into the annular chamber portion 31 formed between the socket 23 and piercing knife 26, such that the cut portion is folded or pushed back against the inner surface of the neck 22 opposite from drainage slot 6 (FIG. 1). The vent cap 28 is then removed from the vent 29 and the syrup from the bottle drains continuously through the discharge port of the socket and into the valve body 30. It is desirable that the membrane material of the bottle be heat-sealable to the opening of the container and made of a material which resists extrusion, so that a clean cut can be made. In a preferred embodiment, the membrane is one sold under the Trademark Safe-Guard by 3M. The cylindrical knife or cutting device is designed for minimum clearance within the neck of the container so that the membrane will shear cleanly and reliably. The disposable syrup package or bottle 21 is constructed of relatively thin side walls and has an openable vent hole which provides for continuous flow of the syrup during dispensing. By opening the vent hole, an effective hydrostatic pressure head provides for the continuous and regular flow of the syrup. The closed end of the bottle or package in which the vent hole is provided is recessed in order to protect the bottle from rupture during shipping. If desired, the vent hole may be provided in the end of a flow rate control tube such as tube 18 of the aforementioned Sedam Patent.

The disposable package or bottle may be fabricated of any suitable material. For example, the bottle 11 of FIG. 3 may be manufactured of a thin plastic or glass, although plastic is preferred. The rupturable membrane 13 provided in the open end of the neck 12 may be a metal foil, plastic or any other suitable material which will seal the end of the container without contaminating its contents. If the membrane is plastic, it may be heat-sealed to the end of the container, which is preferred for ease of assembly. As mentioned above, it is desirable if the membrane is made up of a material which resists extrusion so that no tearing, but rather a clean cut, can be made.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An opening device to be used in a post-mix beverage dispenser, together with a disposable syrup container, said container having a neck portion with an opening sealed by a rupturable membrane from which said syrup will flow when said membrane is ruptured, said device comprising a cylindrical piercing means surrounded by a cylindrically-shaped socket member, said socket member having a discharge port at the bottom thereof, said piercing means and socket member forming an annular compartment surrounding said discharge port defined by the outer wall of said cylindrical piercing means and the inner wall of said socket member for receipt of the neck of said container, *said piercing means and said neck being substantially concentric when the neck is in said socket, the diameter of the outer wall of said piercing means being only slightly less than the diameter of the inner wall of said neck, providing minimum clearance between the piercing means and the neck, and the inner wall of said neck and the outer wall of said piercing means being parallel,* and drainage means through said outer wall of said piercing means for permitting syrup flow from said annular compartment to said discharge port, said piercing means having an angular truncated cutting edge with a pyramidal piercing element on the apex thereof, said socket member being provided with a seal for securely receiving the neck of said syrup container into the compartment formed between said piercing means and socket member.

2. The opening device of claim 1, wherein said truncated cutting edge is so designed that the blade portion thereof will circumscribe about a 240° section in said rupturable membrane.

3. The opening device of claim 1, wherein said drainage means comprises a slot through the wall of said cylindrical piercing means.

4. The opening device of claim [1] *3*, wherein said slot extends from said cutting edge to said discharge port of said socket member.

5. A gravity flow, post-mix beverage dispenser comprising in combination:

a disposable syrup container terminating at one end in a neck sealed by a rupturable membrane and at the other end in a recessed vent opening having means for sealing said opening, and an opening device for said syrup container which comprises a cylindrical piercing means surrounded by a cylindrically-shaped socket member, said socket member having a discharge port at the bottom thereof, said piercing means and socket member forming an annular compartment surrounding said discharge port defined by the outer wall of said piercing [knife] *means* and the inner wall of said socket member for receiving the neck of said container, *said piercing means and said neck being substantially concentric when the neck is in said socket, the diameter of the outer wall of said piercing means being only slightly less than the diameter of the inner wall of said neck, providing minimum clearance between the piercing means and the neck, and the inner wall of said neck and the outer wall of said piercing means being parallel,* and drainage means through said outer wall of said piercing means for permitting syrup flow from said annular compartment to said discharge port, said piercing means having an angular truncated cutting edge with a pyramidal piercing element on the apex thereof, said piercing means being provided for displacing said rupturable membrane upon the insertion of the neck of the container into said compartment.

6. The dispenser of claim 5 wherein said drainage means comprises a slot through the wall of said cylindrical piercing means.

7. The dispenser of claim 6, wherein said slot extends from said cutting edge to said discharge port of said socket member.

8. An opening device to be used in a post-mix beverage dispenser, together with a disposable syrup container, said container having a neck portion with an opening sealed by a rupturable membrane from which said syrup will flow when said membrane is ruptured, said device comprising a cylindrical piercing means surrounded by a cylindrically-shaped socket member, said socket member having a discharge port at the bottom thereof, said piercing means and socket member forming an annular compartment surrounding said discharge port defined by the outer wall of said cylindrical piercing means and the inner wall of said socket member for receipt of the neck of said container, *said piercing means and said neck being substantially concentric when the neck is in said socket, the diameter of the outer wall of said piercing means being only slightly less than the diameter of the inner wall of said neck, providing minimum clearance between the piercing means and the neck, and the inner wall of said neck and the outer wall of said piercing means being parallel,* and drainage means through said outer wall of said piercing means for permitting syrup flow from said annular compartment to said discharge port, said piercing means having a cutting edge with a blade portion and a flat blunt portion, said blade portion puncturing said membrane along an arc commensurate therewith to form a flap and said blunt portion precluding the puncturing of a portion of said membrane opposite thereto to form a hinge, whereby said flap is folded about said hinge against said inner wall of said [socket member] *neck*, said socket member being provided with a seal for securely receiving the neck of said syrup container into the compartment formed between said piercing means and socket member.

9. The opening device of claim 8, wherein said drainage means comprises a slot through the wall of said cylindrical piercing means.

10. The opening device of claim 9, wherein said slot extends from said blunt portion to said discharge port of said socket member.

11. A gravity flow, post-mix beverage dispenser comprising in combination:

a disposable syrup container terminating at one end in a neck sealed by a rupturable membrane and at the other end in a recessed vent opening having a cap for sealing said opening, and an opening device for said syrup container which comprises a cylindrical piercing means surrounded by a cylindrically-shaped socket member, said socket member having a discharge port at the bottom thereof, said piercing means and socket member forming an annular compartment surrounding said discharge port defined by the outer wall of said piercing means and the inner wall of said socket member for receiving the neck of said container, *said piercing means and said neck being substantially concentric when the neck is in said socket, the diameter of the outer wall of said piercing means being only slightly less than the diameter of the inner wall of said neck, providing minimum clearance between the piercing means and the neck, and the inner wall of said neck and the outer wall of said piercing means being parallel,* and drainage means through said outer wall of said piercing means for permitting syrup flow from said annular compartment to said discharge port, said piercing means having a blade portion and a blunt portion, said blade portion puncturing said member along an arc commensurate therewith to form a flap, and said blunt portion precluding the puncturing of a portion of said membrane opposite thereto to form a hinge, whereby said flap is folded about said hinge against said inner wall of said socket member.

12. The dispenser of claim 11, wherein said drainage means comprises a slot through the wall of said cylindrical piercing means.

13. The drainage of claim 12, wherein said slot extends from said blunt portion to said discharge port of said socket member.

14. An opening device to be used in a post-mix beverage dispenser, together with a disposable syrup container, said container having a neck portion with an opening sealed by a rupturable membrane from which said syrup will flow when said membrane is ruptured, said device comprising a cylindrical piercing means surrounded by a cylindrically-shaped socket member, said socket member having a discharge port at the bottom thereof, said piercing means and socket means forming an annular compartment surrounding said discharge port defined by the outer wall of said cylindrical piercing means and the inner wall of said socket member, for receipt of the neck of said container, *said piercing means and said neck being substantially concentric when the neck is in said socket, the diameter of the outer wall of said piercing means being only slightly less than the diameter of the inner wall of said neck, providing minimum clearance between the piercing means and the neck,* and drainage means through said outer wall of said piercing meand for permitting syrup flow from said annular compartment to said discharge port, said piercing means having a cutting edge on a top end thereof.

15. The opening device of claim 14, wherein said drainage means comprises a slot through the wall of said cylindrical piercing means.

16. The opening device of claim 15, wherein said slot extends from said cutting edge to said discharge port of said socket member.

17. A gravity flow, post-mix beverage dispenser comprising in combination:

a disposable syrup container terminating at one end in a neck sealed by a rupturable membrane and at the other end in a recessed vent opening having means for sealing said opening, and an opening device for said syrup container which comprises a cylindrical piercing means surrounded by a cylindrically-shaped socket member, said socket member having a discharge port at the bottom thereof, said piercing means and socket member forming an annular compartment surrounding said discharge port defined by the outer wall of said piercing means and the inner wall of said socket member for receiving the neck of said container, *said piercing means and said neck being substantially concentric when the neck is in said socket and the diameter of the outer wall of said piercing means being only slightly less than the diameter of the inner wall of said neck, providing minimum clearance between the piercing means and the neck,* and drainage means through said outer wall of said piercing means for permitting syrup flow from said annular compartment to said discharge port, said piercing means having a cutting edge on a top end thereof.

18. The dispenser of claim 17, wherein said drainage means comprises a slot through the wall of said cylindrical piercing means.

19. The dispenser of claim 18, wherein said slot extends from said cutting edge to said discharge port of said socket member.

*20. An opening device to be used in a post-mix beverage dispenser, together with a syrup container, said container having a neck portion with an opening sealed by a displaceable member from which said syrup will flow when said member is displaced, said device comprising a cylindrical pushing means surrounded by a cylindrically-shaped socket member, said socket member having a discharge port at the bottom thereof, said pushing means and socket means forming an annular compartment surrounding said discharge port defined by the outer wall of said cylindrical pushing means and the inner wall of said socket member, for receipt of the neck of said container, said pushing means and said neck being substantially concentric when the neck is in said socket, the diameter of the outer wall of said pushing means being only slightly less than the diameter of the inner wall of said neck, providing minimum clearance between the pushing means and the neck, and the inner wall of said neck and the outer wall of said pushing means being parallel, and drainage means through said outer wall of said pushing means for permitting syrup flow from said annular compartment to said discharge port, said pushing means having an actuator edge on a top end thereof.*

*21. The opening device of claim 20, wherein said drainage means comprises a slot through the wall of said cylindrical pushing means.*

*22. The opening device of claim 21, wherein said slot extends from said actuator edge to said discharge port of said socket member.*

*23. An apparatus to be used in a post-mix beverage dispenser, together with a syrup container, said container having a neck portion, sealed by a displaceable member, from which said syrup will flow when said displaceable member is displaced, said apparatus comprising:*

*a cylindrically-shaped opening device surrounded by a cylindrically-shaped socket member, said opening device having a discharge port at the bottom thereof;*

*said opening device and said socket member forming an annular compartment, defined by the outer wall of said opening device and the inner wall of said socket member, for receipt of said neck of said container, said opening device and said neck being substantially concentric when the neck is in the said socket, the diameter of the outer wall of said opening device being only slightly less than the diameter of the inner wall of said neck, providing minimum clearance between the opening device and neck, and the inner of said neck and the outer wall of said opening device being parallel; and drainage means through said outer wall of said opening device for permitting syrup flow said annular compartment to said discharge port, whereby overflow of syrup from the top of said annular compartment is minimized.*

*24. The apparatus defined in claim 23, wherein said drainage means comprises a slot through the wall of said opening device.*

*25. The apparatus defined in claim 24, wherein said opening device further includes a top edge adapted to displace said displaceable member when said neck of said container is seated in said annular compartment.*

*26. The apparatus defined in claim 25, wherein said slot extends from said top edge to said discharge port.*

* * * * *